US009418031B2

(12) United States Patent
Aldrey et al.

(10) Patent No.: US 9,418,031 B2
(45) Date of Patent: Aug. 16, 2016

(54) MEDIA CONTENT ASSET RECOVERY METHODS AND SYSTEMS

(71) Applicant: Verizon Patent and Licensing Inc., Arlington, VA (US)

(72) Inventors: Raul I. Aldrey, Plano, TX (US); Donald H. Relyea, Dallas, TX (US); Venkata S. Adimatyam, Irving, TX (US); Kishore Tallapaneni, Flower Mound, TX (US); Michael R. Oliver, Hoboken, NJ (US); George M. Higa, Plano, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 190 days.

(21) Appl. No.: 13/731,619

(22) Filed: Dec. 31, 2012

(65) Prior Publication Data

US 2014/0186001 A1 Jul. 3, 2014

(51) Int. Cl.
*G06F 13/38* (2006.01)
*H04N 21/462* (2011.01)
*H04N 7/173* (2011.01)
*H04N 5/85* (2006.01)
*H04N 5/781* (2006.01)

(52) U.S. Cl.
CPC .............. *G06F 13/38* (2013.01); *G06F 13/385* (2013.01); *H04N 7/17318* (2013.01); *H04N 21/4622* (2013.01); *H04N 5/781* (2013.01); *H04N 5/85* (2013.01)

(58) Field of Classification Search
CPC ........... H04N 5/765; H04N 5/76; H04N 7/16; H04N 7/18; H04N 9/88; H04N 7/173; G06F 13/00; G06F 13/38; G06F 3/00
USPC .............. 386/200, 263, 291, E5.001, E5.002, 386/293, 328, 332; 348/143, E7.054, 348/E7.086; 725/140, 141, 86, 102, 105, 725/109, 110, 135; 707/999.204
See application file for complete search history.

(56) References Cited

U.S. PATENT DOCUMENTS

| 8,139,924 | B2* | 3/2012 | Walters et al. | 386/328 |
| 8,160,424 | B2* | 4/2012 | Cha et al. | 386/263 |
| 2005/0010616 | A1* | 1/2005 | Burks | 707/204 |
| 2008/0002951 | A1* | 1/2008 | Russ et al. | 386/124 |
| 2008/0118227 | A1* | 5/2008 | Barton | H04N 5/76 386/332 |
| 2008/0218590 | A1* | 9/2008 | Park et al. | 348/143 |
| 2009/0254966 | A1* | 10/2009 | Josephs et al. | 725/140 |

* cited by examiner

*Primary Examiner* — Geepy Pe
*Assistant Examiner* — Syed Hasan

(57) ABSTRACT

An exemplary method includes a media content asset recovery system 1) detecting a migration of a user account from being associated with a first DVR system to being associated with a second DVR system, 2) identifying, in response to the detecting, a media content asset included within a library of one or more media content assets stored by the first DVR system at a time associated with the migration, 3) selecting, in accordance with a source selection heuristic, a media content source other than the first DVR system and that is configured to distribute the media content asset, and 4) directing the second DVR system to acquire the media content asset from the selected media content source for storage by the second DVR system.

20 Claims, 16 Drawing Sheets

MEDIA CONTENT ASSET RECOVERY METHODS AND SYSTEMS

BACKGROUND INFORMATION

Digital video recording ("DVR") systems allow users to record media content assets (e.g., television programs, etc.) and then view or otherwise experience the recorded media content assets. For example, a user may use a DVR system to schedule a recording of a particular television program, after which the DVR system may record the television program and allow the user to play back the recorded television program in a time-shifted manner.

Over time, a first DVR system may record and store (e.g., within a hard drive) an extensive library of media content assets. Unfortunately, if the user desires to upgrade or otherwise switch to using a second (e.g., new) DVR system, it is currently difficult or impossible to transfer the stored library of media content assets from the first DVR system to the second DVR system. For example, the first DVR system may be technologically incapable of transferring media content assets to another DVR system, the library of media content assets may have been stored in a format not supported by the second DVR system, and/or the library of media content assets may be protected with digital rights management ("DRM") technology that makes the library of media content assets unplayable on other DVR systems.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Media content asset recovery methods and systems are described herein. In some examples, the methods and systems described herein may be used in scenarios in which a user account migrates from being associated with a first DVR system to being associated with a second DVR system. For example, as will be described below, a media content asset recovery system may 1) detect a migration of a user account from being associated with a first DVR system to being associated with a second DVR system, 2) identify, in response to the detection, a media content asset included within a library of one or more media content assets stored by the first DVR system at a time associated with the migration, 3) select, in accordance with a source selection heuristic, a media content source other than the first DVR system and that is configured to distribute the media content asset, and 4) direct the second DVR system to acquire the media content asset from the selected media content source for storage by the second DVR system.

As used herein, a "media content asset" may refer to any media content program, television program, on-demand media program, pay-per-view media program, broadcast media program (e.g., broadcast television program), multicast media program (e.g., multicast television program), narrowcast media program (e.g., narrowcast video-on-demand program), IPTV media content, advertisement, video, movie, audio program, radio program, or any segment, component, or combination of these or other forms of media content that a user may access by way of a DVR system.

Various benefits may be realized in accordance with the methods and systems described herein. For example, the methods and systems described herein may allow a user to migrate from using a first DVR system to using a second DVR system without losing access to a library of media content assets stored by the first DVR system and/or without having to manually rebuild the library of media content assets over time. Moreover, the methods and systems described herein may optimize the library of media content assets as they are stored by the second DVR system. For example, the methods and systems may acquire a relatively better version of a particular media content asset stored by the first DVR system for storage by the second DVR system in terms of resolution, video format, and/or any other characteristic of the media content asset.

Figure 1:
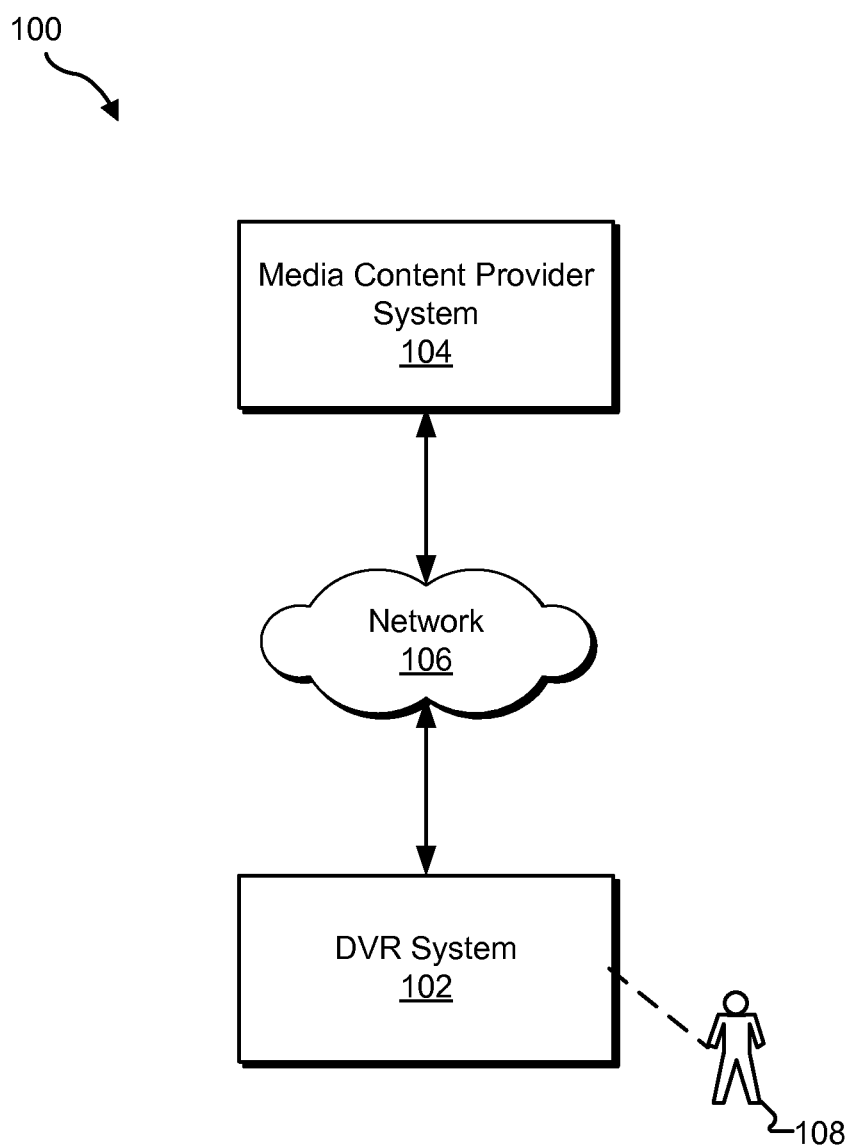
FIG. 1 illustrates an exemplary configuration in which a DVR system is communicatively coupled to a media content provider system according to principles described herein.

FIG. 1 illustrates an exemplary configuration 100 in which a DVR system 102 is communicatively coupled to a media content provider system 104. As will be described below, various components of the media content asset recovery system described herein may be implemented by DVR system 102 and/or media content provider system 104.

DVR system 102 and media content provider system 104 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

DVR system 102 and media content provider system 104 may communicate using any suitable network. For example, as shown in FIG. 1, DVR system 102 and media content provider system 104 may be configured to communicate with each other by way of network 106. Network 106 may include one or more networks or types of networks capable of carrying communications and/or data signals between DVR system 102 and media content provider system 104. For example, network 106 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network, any other suitable network, and/or any combination or sub-combination of these networks.

Media content provider system 104 may be associated with a service provider (e.g., a subscriber television service provider, an Internet service provider, a DVR service provider, etc.), a media content asset provider (e.g., ESPN, NBC, etc.), and/or any other type of media content provider. Accordingly, media content provider system 104 may be configured to provide one or more media content services (e.g., DVR services, television services, video-on-demand services, Internet services, electronic program guide services, etc.) to DVR system 102 and/or to users by way of DVR system 102. For example, media content provider system 104 may be configured to manage (e.g., maintain, process, distribute, and/or generate) media content assets and/or electronic program guide data configured to be delivered to DVR system 102. Media content provider system 104 may be implemented by one or more computing devices (e.g., one or more servers associated with one or more entities) as may serve a particular implementation.

DVR system 102 may facilitate access by one or more users to media content (e.g., media content assets) provided by media content provider system 104. For example, DVR system 102 may present and/or record media content assets at the direction of one or more users. To this end, DVR system 102 may include one or more tuners. Each tuner may be configured to be tuned to a particular media content asset at the direction of DVR system 102 and/or at the direction of a user of DVR system 102. This may be performed in any suitable manner. For example, a tuner may tune to a media content asset by tuning to a media content channel carrying the media content asset. Additionally or alternatively, a tuner may tune (e.g., switch) to a digital stream of data packets (e.g., Internet Protocol ("IP") based data packets) carrying the media content asset. Hence, as used herein, a "tuner" may be implemented by one or more hardware components and/or one or more software components.

In some examples, DVR system 102 may be associated with a user account maintained by and/or otherwise corresponding to one or more users (e.g., user 108 shown in FIG. 1). For example, the user may associate his or her user account with DVR system 102 by subscribing to a DVR service provided by way of DVR system 102, registering the user account with DVR system 102 (e.g., by logging in to DVR system 102), and/or in any other manner.

In some examples, DVR system 102 may be provided and/or otherwise managed by a media content provider and/or a service provider associated with media content provider system 104. For example, DVR system 102 may be provided by a particular subscriber television service provider. As will be described below, a user may in some instances desire to switch subscriber television service providers, which may necessitate a corresponding switch in the particular DVR system to which the user is associated.

DVR system 102 may be implemented by any suitable combination of media content processing or computing devices ("processing devices"). For example, DVR system 102 may be implemented by one or more local processing devices each associated with the same user account (i.e., processing devices that the user interacts with directly such as set-top box devices, DVR devices, receivers, personal computers, mobile devices (e.g., mobile phones and/or tablet computers), personal-digital assistant devices, gaming devices, television devices, etc.). Each processing device may include a storage device configured to store data associated with the processing device and one or more processors configured to perform the operations described herein.

Figure 2:
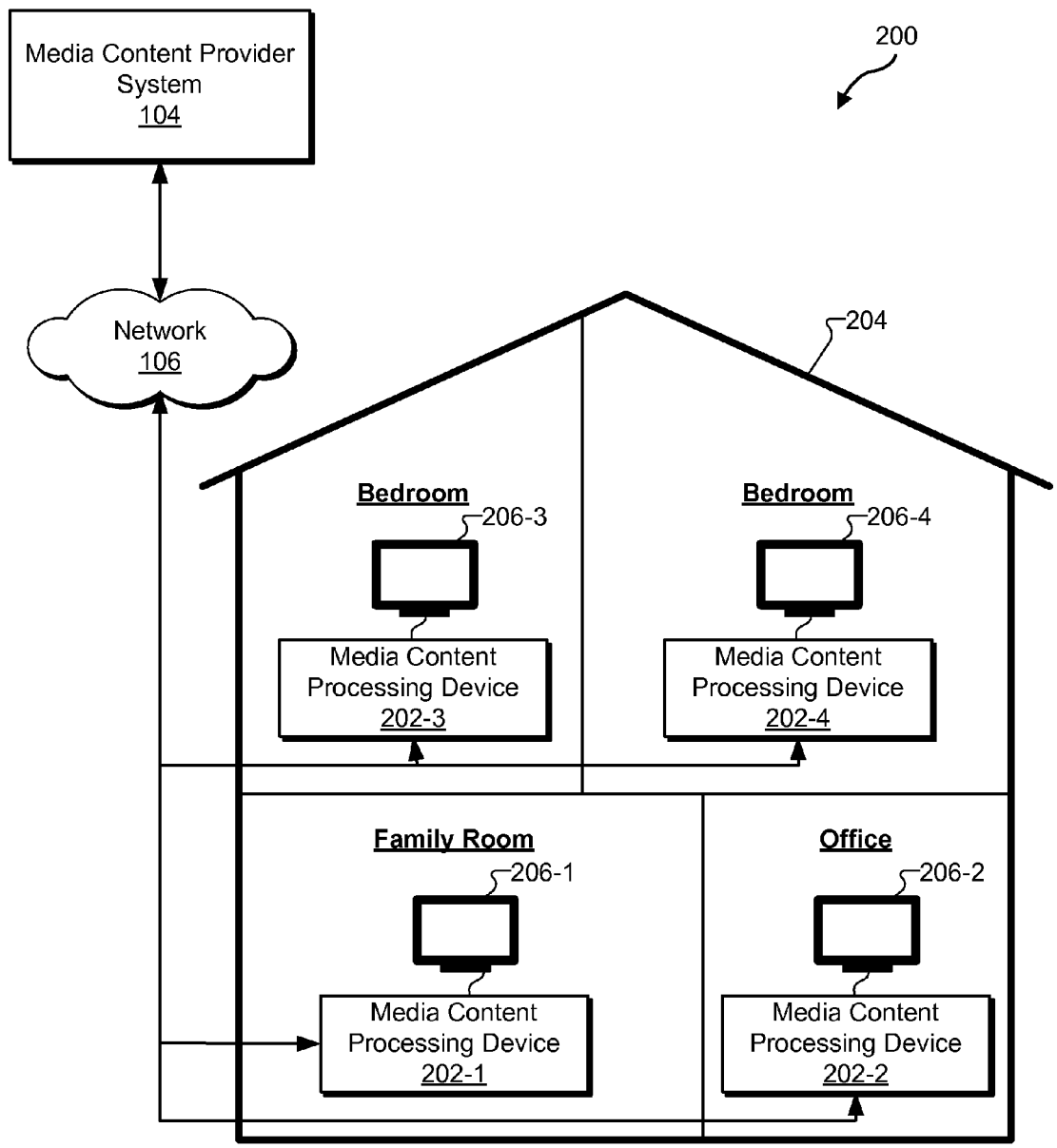
FIG. 2 shows an exemplary implementation of a DVR system according to principles described herein.

To illustrate, FIG. 2 shows an exemplary implementation 200 of DVR system 102 in which DVR system 102 is implemented by a plurality of media content processing devices 202 (e.g., media content processing devices 202-1 through 202-4) located within a particular premises 204 (e.g., a home). Each media content processing device 202 may be implemented by one or more of the local processing devices described herein. For example, each media content processing device may be implemented by a set-top box device having DVR capabilities.

As shown, media content processing device 202 may be distributed throughout premises 204. For example, FIG. 2 shows that media content processing devices 202 are distributed throughout various rooms of premises 204. In this manner, users located within premises 204 may experience and/or otherwise interact with media content at various locations throughout premises 204.

Media content processing devices 202 may each be associated with (e.g., connected to) a display 206 (e.g., displays 206-1 through 206-4). Displays 206 may include any suitable display device separate from media content processing devices 202 (e.g., televisions, computer monitors, etc.) and/or any suitable display device integrated into media content processing devices 202 (e.g., display screens). Media content processing devices 202 may be configured to present media content by way of displays 206.

As shown, each media content processing device 202 may be communicatively coupled to media content provider system 104 by way of network 106. This may be realized in any suitable manner.

Figure 3:
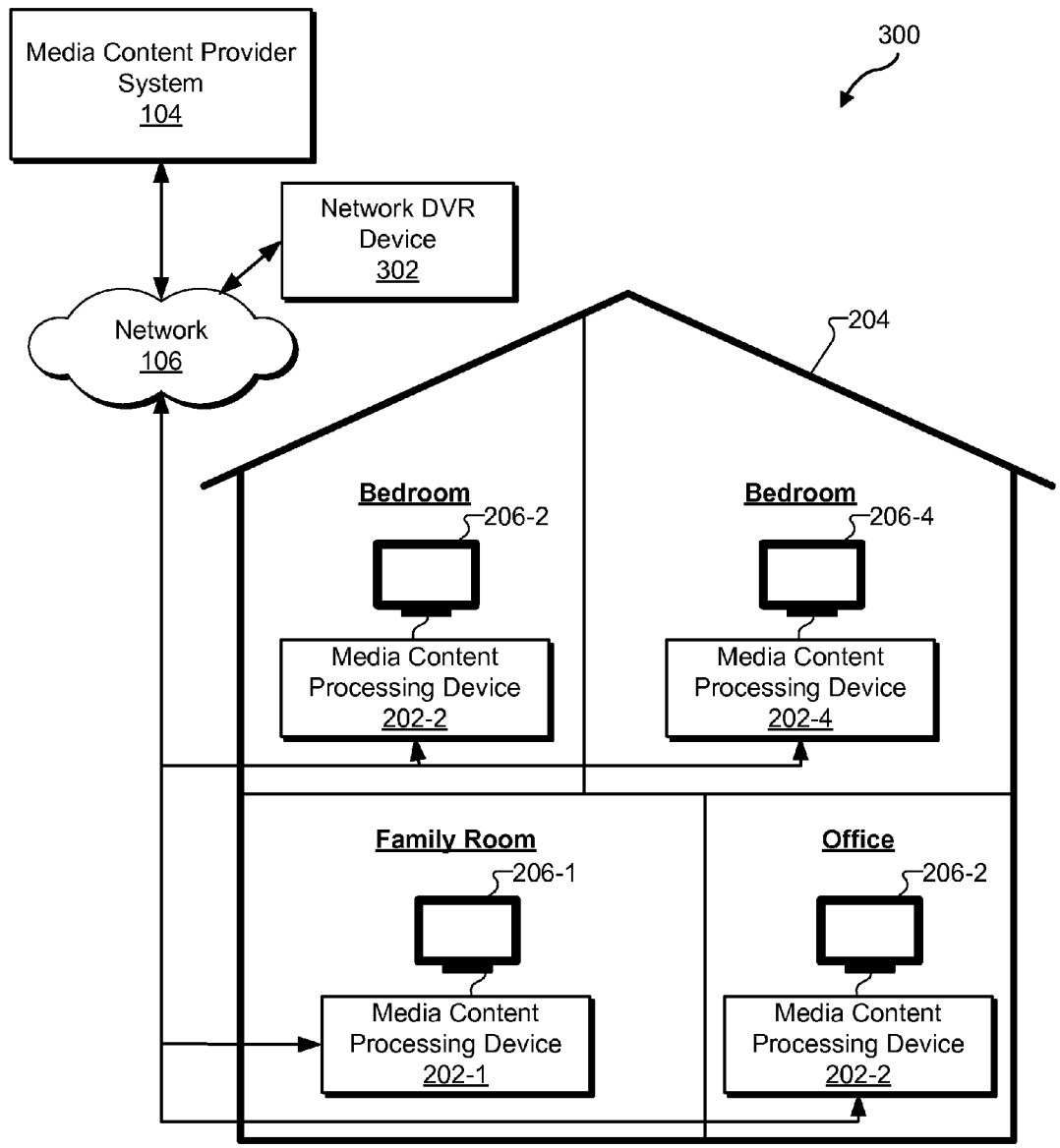
FIG. 3 shows another exemplary implementation of a DVR system according to principles described herein.

DVR system 104 may additionally or alternatively be implemented by one or more remote processing devices. For example, FIG. 3 shows another exemplary implementation 300 of DVR system 102 in which DVR system 102 is at least partially implemented by a network DVR device 302. Network DVR device 302 may be implemented by one or more computing devices (e.g., one or more servers) configured to provide DVR services.

As shown, network DVR device 302 may be remote from premises 204 and may be configured to communicate with media content processing devices 202 and media content provider system 104 by way of network 106. In this implementation, network DVR device 302 may perform one or more DVR operations traditionally performed by local DVR devices. For example, network DVR device 302 may record and/or store media content assets, stream media content assets to media content processing devices 202, and/or perform any other DVR operation as may serve a particular implementation. Each media content processing device 202 may be configured to interface with network DVR device 302 such that one or more users located within premises 204 may direct network DVR device 302 to perform one or more DVR operations.

In some examples, network DVR device 302 may be associated with and/or maintained by a media content provider and/or a service provider associated with media content provider system 104. For example, network DVR device 302 may be located at a premises maintained by a subscriber television service provider.

Figure 4:
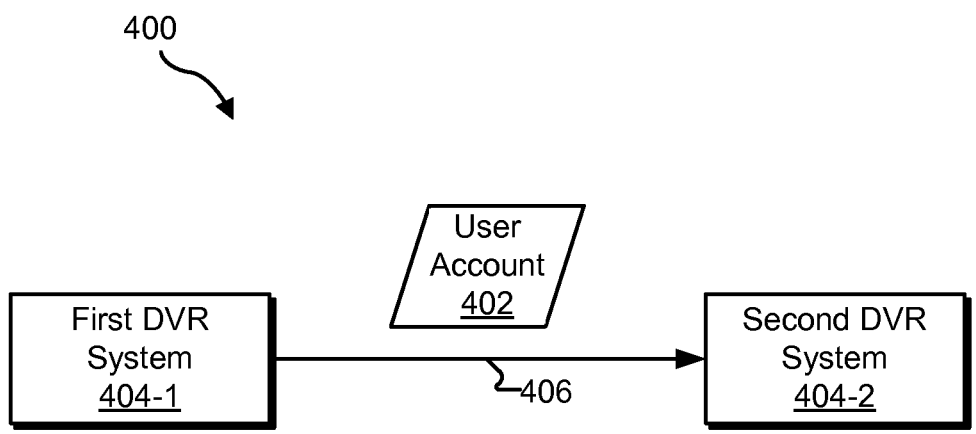
FIG. 4 illustrates an exemplary scenario in which a user account migrates from being associated with a first DVR system to being associated with a second DVR system according to principles described herein.

FIG. 4 illustrates an exemplary scenario 400 in which a user account 402 migrates from being associated with a first DVR system 404-1 to being associated with a second DVR system 404-2. The migration is represented in FIG. 4 by arrow 406. First and second DVR systems 404-1 and 404-2 (collectively "DVR systems 404") may be similar to DVR system 102 and may be implemented in any of the ways described herein.

Various situations may arise in which it is desirable for user account 402 to migrate from being associated with first DVR system 404-1 to being associated with second DVR system 404-2, as shown in FIG. 4. For example, a user associated with user account 402 may desire to upgrade from using first DVR system 404-1 (e.g., a legacy DVR system with limited storage capacity and/or other limited features) to using second DVR system 404-2 (e.g., a new DVR system with relatively more storage capacity and/or relatively enhanced features).

Additionally or alternatively, the user may desire to consolidate the number of processing devices that he or she uses. For example, the user may desire to switch from using multiple set-top box devices (e.g., multiple set-top box devices that implement first DVR system 404-1) each with a relatively small storage capacity to using a single set-top box device (e.g., a single set-top box device that implements second DVR system 404-2) that has a relatively large storage capacity.

Additionally or alternatively, the user may desire to switch from a first DVR service provider (e.g., a first subscriber television service provider) associated with (e.g., that provides) first DVR system 404-1 to a second DVR service provider (e.g., a second subscriber television service provider) associated with (e.g., that provides) second DVR system 404-2.

In each of these cases, it may be desirable for the second DVR system 404-2 to replicate a library of media content assets stored by the first DVR system 404-1. However, as described above, it may be difficult or impossible to acquire (e.g., transfer) the library of media content assets directly from the first DVR system 404-1.

Figure 5:
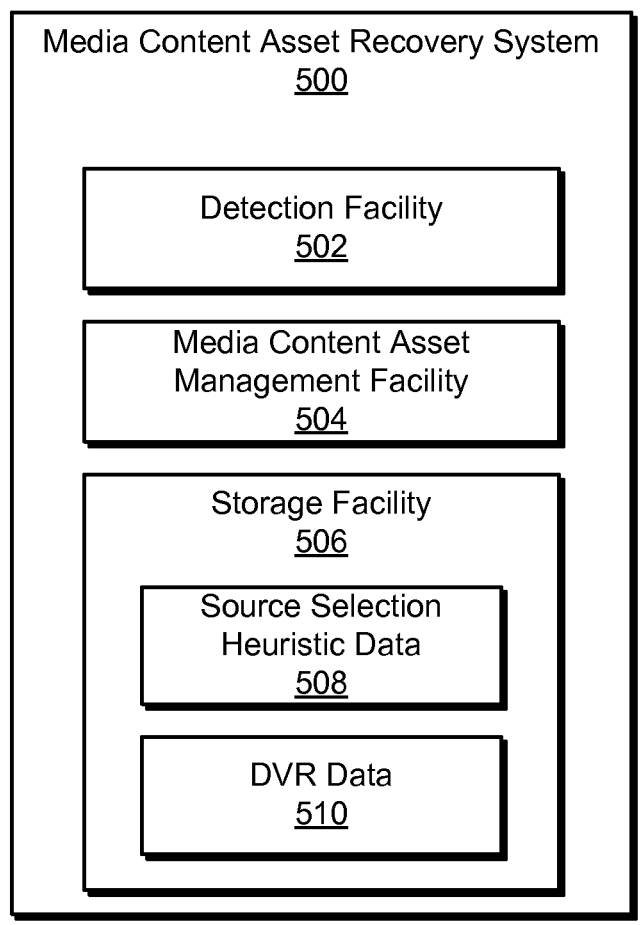
FIG. 5 illustrates an exemplary media content asset recovery system according to principles described herein.

To this end, FIG. 5 illustrates an exemplary media content asset recovery system 500 ("system 500") configured to facilitate recovery (e.g., rebuilding) of a library of media content assets stored by a first DVR system (e.g., first DVR system 404-1) for storage by a second DVR system (e.g., second DVR system 404-2). As shown, system 500 may include, without limitation, a detection facility 502, a media content asset management facility 504, and a storage facility 506 selectively and communicatively coupled to one another.

It will be recognized that although facilities 502-506 are shown to be separate facilities in FIG. 5, any of facilities 502-506 may be combined into fewer facilities, such as into a single facility, or divided into more facilities as may serve a particular implementation.

System 500 may be implemented by any suitable combination of computing devices and/or systems. For example, facilities 502-506 of system 500 may be implemented entirely by media content provider system 104, by a server not associated with media content provider system 104, by a DVR system (e.g., second DVR system 404-2), and/or by any other device and/or system. Alternatively, facilities 502-506 of system 500 may be distributed across any combination of these systems and/or devices.

Detection facility 502 may be configured to detect a migration of a user account from being associated with a first DVR system (e.g., first DVR system 404-1) to being associated with a second DVR system (e.g. second DVR system 404-2). This may be performed in any suitable manner. For example, detection facility 502 may detect a request provided by a user associated with the user account to upgrade or otherwise switch from the first DVR system to the second DVR system. As another example, detection facility 502 may detect the migration by detecting a registration of the user account with the second DVR system. As another example, detection facility 502 may detect the migration by detecting a generation and association of a DVR data set with the second DVR system. DVR data sets will be described in more detail below.

Media content asset management facility 504 may be configured to perform one or more media content asset management operations. For example, in response to detection facility 502 detecting the migration of the user account from being associated with the first DVR system to being associated with the second DVR system, media content asset management facility 504 may identify a media content asset included within a library of media content assets stored by the first DVR system at a time associated with the migration (e.g., at a time that a user associated with the user account requests to migrate to the second DVR system, at a particular time prior to the migration, and/or any other time associated with the migration as may serve a particular implementation).

The media content asset may be identified by media content asset management facility 504 in any suitable manner. For example, media content asset management facility 504 may identify the media content asset in accordance with DVR data associated with the second DVR system and generated in conjunction with the migration of the user account to the second DVR system.

The terms "DVR data" and "DVR data set" may refer to any data associated with (e.g., maintained and/or used by) a DVR system. In some examples, the DVR data may be separate from data representative of a library of media content assets stored by the DVR system (i.e., one or more data files representative of each media content asset included in the library of media content assets). For example, a DVR data set associated with a DVR system that the user has used over a period of time to acquire (e.g., record) a library of media content assets may include metadata descriptive of one or more characteristics of the media content assets, data representative of settings of the DVR system (e.g., recording instructions provided by the user to acquire the media content assets, recording conflict resolution rules, etc.), and/or data representative of business logic used by the DVR system to implement the various recording instructions provided by the user and/or any other operation performed by the DVR system.

Figure 6:
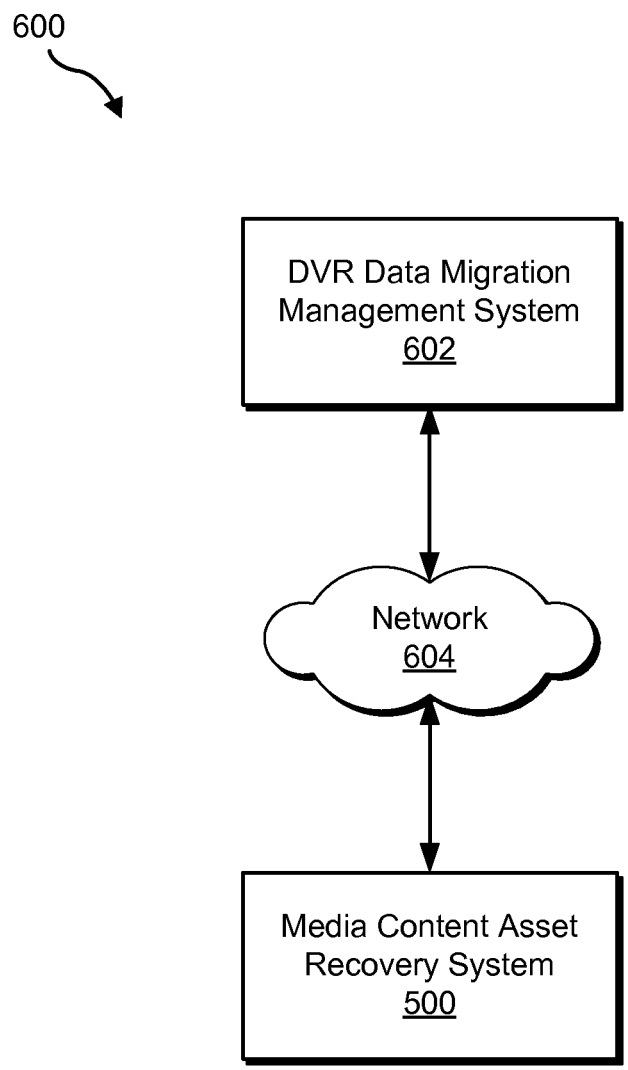
FIG. 6 illustrates an exemplary configuration in which a DVR data management system generates a DVR data set in conjunction with the migration of the user account to the second DVR system according to principles described herein.

The DVR data accessed by media content asset management facility 504 to identify the media content asset included in the library of media content assets may be generated in any suitable manner. For example, FIG. 6 illustrates an exemplary configuration 600 in which a DVR data management system 602 separate from media content asset recovery system 500 generates a DVR data set in conjunction with the migration of the user account to the second DVR system. It will be recognized that in some alternative embodiments, media content asset recovery system 500 itself (e.g., media content asset management facility 504) may generate the DVR data set by performing any of the functions described in connection with DVR data management system 602.

As shown, DVR data migration management system 602 may communicate with media content asset recovery system 500 by way of network 604, which may include and/or be similar to network 106. In this manner, media content asset recovery system 500 may access (e.g., receive) DVR data generated by DVR data migration management system 602.

DVR data management system 602 may generate a DVR data set in any suitable manner. For example, in response to a request for a user account to migrate from being associated with the first DVR system to being associated with the second DVR system (a "migration request"), DVR data migration management system 602 may access a first DVR data set associated with the first DVR system. In some alternative examples, DVR data migration management system 602 may access the first DVR data set, at least partially, prior to the migration request.

DVR data migration management system 602 may access the first DVR data set associated with the first DVR system in any suitable manner. For example, in some cases, the first DVR data set is stored by the first DVR system. In these cases, DVR data migration management system 602 may access the first DVR data set by directing the first DVR system to upload the first DVR data set to system 100. Alternatively, DVR data migration management system 602 may access the first DVR data set by accessing the first DVR data set directly from the first DVR system (e.g., by analyzing the first DVR data set stored by the first DVR system without requiring the first DVR system to first upload the first DVR data set to system 100).

DVR data migration management system 602 may additionally or alternatively access at least a portion of the first DVR data set from a computing system other than the first DVR system. For example, a media content provider, an electronic program guide provider, and/or any other entity may maintain at least a portion of the first DVR data set on a server or the like that is remote from the first DVR system. In this case, DVR data migration management system 602 may acquire at least a portion of the first DVR data set from one or more of these sources.

DVR data migration management system 602 may be further configured to generate a second DVR data set based on the first DVR data set and in accordance with one or more attributes of the second DVR system. The second DVR data set may be generated in any suitable manner. For example, the second DVR data set may be generated by modifying the first DVR data set in accordance with the one or more attributes of the second DVR system.

Figure 7:
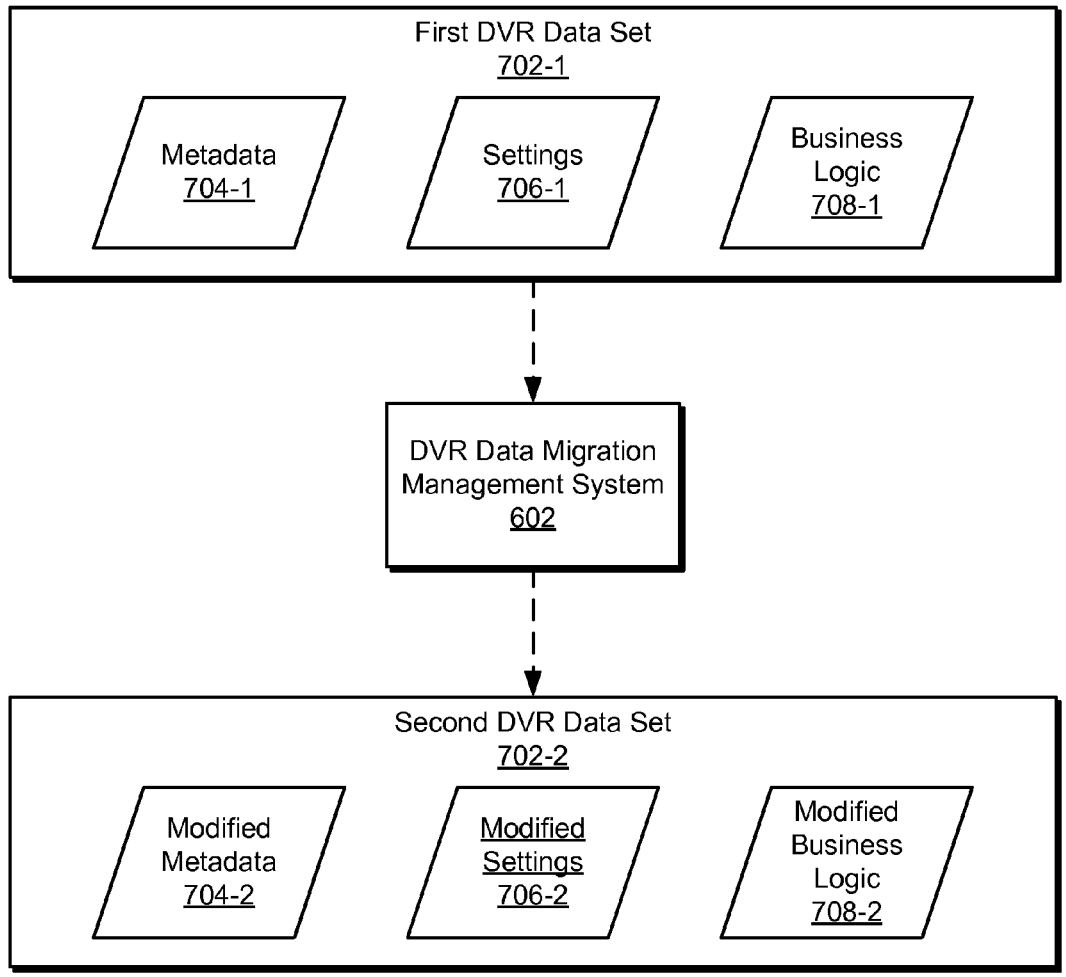
FIG. 7 illustrates an exemplary generation of a second DVR data set based on a first DVR data set according to principles described herein.

To illustrate, FIG. 7 illustrates an exemplary generation of a second DVR data set 702-2 based on a first DVR data set 702-1 that may be performed by DVR data migration management system 602. As shown, first DVR data set 702-1 may include metadata 704-1, settings data 706-1, and business logic data 708-1 associated with one or more operations performed by the first DVR system. It will be recognized that first DVR data set 702-1 may include only one or more of these types of data and/or any other type of data as may serve a particular implementation. Metadata 704-1, settings data 706-1, and business logic data 708-1 will now be described in more detail.

Metadata 704-1 may include any data descriptive of one or more attributes of the media content assets included in the library of media content assets stored by the first DVR system. For example, metadata 704-1 may include, but is not limited to, time data, physical location data, user data, source data, destination data, size data, creation data, modification data, access data (e.g., play counts), and/or any other data descriptive of the media content assets. For example, metadata associated with a television program may include a title of the television program, a name of one or more people associated with the television program (e.g., actors, directors, producers, creators, etc.), a rating of the television program (e.g., user ratings, critic ratings, etc.), a synopsis of the television program, a setting of the television program, a theme of the television program, a format of the television program, a quality (e.g., resolution) of the television program, a size of the television program, a time or date associated with the television program (e.g., time or date of production, time or date of release, etc.), a color content of the television program, a bit rate of the television program, a compression amount of the television program, a codec associated with the television program, and/or any other information corresponding to the television program as may serve a particular application. Metadata corresponding to other types of media content assets may include additional or alternative information.

Settings data 706-1 may be representative of one or more settings of the first DVR system. Settings data 706-1 may be generated in response to user input. For example, settings data 706-1 may be representative of one or more recording instructions provided by the user and/or one or more recording conflict resolution rules specified by the user. To illustrate, settings data 706-1 may specify that the first DVR system is to record each episode of a television series scheduled to be broadcast over a period of time. Settings data 706-1 may additionally or alternatively be generated automatically by the first DVR system. For example, settings data 706-1 may be representative of one or more manners in which one or more options are presented to a user within an interface.

Business logic data 708-1 may be representative of business logic used by the first DVR system to implement the various operations performed by the first DVR system. For example, business logic data 708-1 may be representative of a manner in which the first DVR system handles the various recording requests provided by the user. To illustrate, business logic data 708-1 may specify a manner in which a recording conflict is handled by the first DVR system when the user provides a request to record a particular media content asset.

Business logic data 708-1 may be dynamically generated over time as the user interacts with the first DVR system. In this manner, the first DVR system may "learn" one or more tendencies and/or preferences of the user. For example, the first DVR system may recognize that the user likes to watch a particular genre of media content assets based on a viewing history of the user. The first DVR system may accordingly update its business logic data 708-1 and, based on this data, automatically recommend one or more media content assets in the same genre to the user.

In some examples, DVR data migration management system 602 may generate second DVR data set 702-2 by modifying the data included in first DVR data set 702-1 in accordance with one or more attributes of the second DVR system. For example, as illustrated in FIG. 7, second DVR data set 702-2 may include modified metadata 704-2, modified settings data 706-2, and modified business logic data 708-2. Modified metadata 704-2 may include a modified version of metadata 704-1 that takes into account the one or more attributes of the second DVR system. Likewise, modified settings data 706-2 may include a modified version of settings data 706-1 that takes into account the one or more attributes of the second DVR system, and modified business logic data 708-2 may include a modified version of business logic data 708-1 that takes into account the one or more attributes of the second DVR system.

It will be recognized that in some alternative examples, one or more types of data included in first DVR data set 702-1 may not be modified by DVR management facility 504 during the generation of second DVR data set 702-2. For example, DVR data migration management system 602 may determine that the same metadata, settings data, and/or business logic data included in first DVR data set 702-1 should be included in second DVR data set 702-2. In these cases, DVR data migration management system 602 may generate second DVR data set 702-2 by copying or otherwise replicating the metadata, settings data, and/or business logic data included in first DVR data set 702-1. Additionally or alternatively, DVR data migration management system 602 may generate completely new metadata, settings data, and/or business logic data for inclusion in second DVR data set 702-2.

DVR data management migration system 602 and the process of generating a DVR data set associated with a DVR system to which a user account migrates are described in more detail in co-pending U.S. patent application Ser. No. 13/731,571, filed the same day as the present application, and entitled "Methods and Systems for Facilitating Migration of a User Account from a First Digital Video Recording ("DVR") System to a Second DVR System," the contents of which are incorporated herein by reference in their entirety.

Hence, in some examples, media content asset management facility 504 may identify the media content asset included in the library of media content assets stored by the first DVR system by accessing (e.g., receiving) a second DVR data set associated with the second DVR system and that is based on a first DVR data set associated with the first DVR system. Media content asset management facility 504 may then use the second DVR data set (e.g., metadata included in the second DVR data set) to identify the media content asset.

Once a media content asset included in the library of media content assets has been identified, media content asset management facility 504 may select, in accordance with a source selection heuristic, a media content source configured to distribute the media content asset and then direct the second DVR system to acquire the media content asset from the selected media content source for storage by the second DVR system. The selected media content source may include any source other than the first DVR system and may be selected in accordance with any suitable source selection heuristic.

Figure 8:
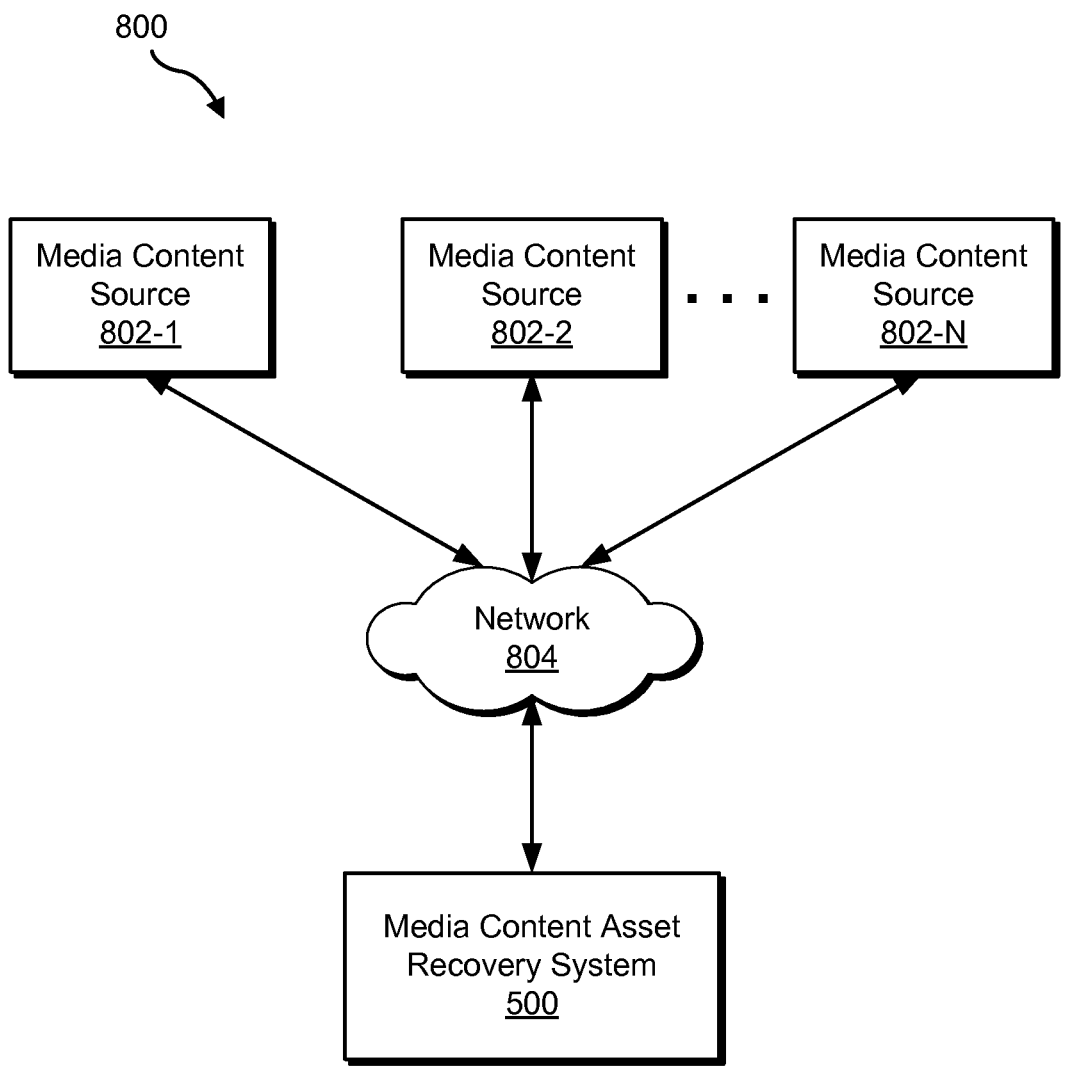
FIG. 8 shows an exemplary configuration in which a media content asset recovery system may select a media content source from a plurality of media content sources according to principles described herein.

To illustrate, FIG. 8 shows an exemplary configuration 800 in which media content asset recovery system 500 may select a media content source from a plurality of media content sources 802 (e.g., media content source data 802-1 through media content source 802-N). As shown, media content asset recovery system 500 may communicate with media content sources 802 by way of a network 804, which may include any of the networks described herein.

Each media content source 802 may have one or more media content assets available for distribution. However, each media content source 802 may be distinct in terms of how it maintains and/or distributes a particular media content asset. For example, media content sources 802 may include an Internet source configured to maintain one or more downloadable files representative of the media content asset, a broadcast television source configured to broadcast the media content asset during a scheduled time period, a video-on-demand source configured to distribute the media content assets in the form of video-on-demand assets, a streaming content source configured to stream the media content asset on demand or during a scheduled time period, a multicast distribution source configured to multicast the media content asset during a scheduled time period, a DVR system associated with a different user account and configured to distribute the media content assets in accordance with a peer-to-peer file sharing heuristic, and/or any other type of media content source as may serve a particular implementation.

As another example, different versions of the same media content asset may be maintained and distributed by different media content sources 802. To illustrate, media content source 802-1 may maintain and distribute a version of a media content asset that has a particular video quality (e.g., standard definition ("SD"), high definition ("HD"), etc.), file size, and/or format (e.g., MPEG-4, AVI, etc.) while media content source 802-2 may maintain and distribute a version of the media content asset that has a different video quality, file size, and/or format. It will be recognized that the versions of the media content asset maintained by each media content source 802-1 may have any other unique attribute.

As mentioned, media content asset management facility 504 may select a particular media content source (e.g., one of media content sources 802) from which the second DVR system is to acquire a media content asset in accordance with a source selection heuristic. As used herein, a "source selection heuristic" may refer to any heuristic or technique that may be used by media content asset management facility 504 to select a particular media content source from which the second DVR system may acquire a particular media content asset for storage by the second DVR system. Using the source selection heuristic, media content asset management facility 504 may optimize a manner in which the media content asset is acquired by the second DVR system.

To illustrate, the source selection heuristic may be based on a relative importance of a plurality of source selection factors associated with a plurality of media content sources. For example, media content asset management facility 504 may select a particular media content source from a plurality of media content sources by weighing a plurality of source selection factors associated with the plurality of media content sources and selecting the media content source from the plurality of media content sources in accordance with the weighing of the source selection factors.

The source selection factors considered by media content asset management facility 504 may include any factor associated with the media content sources and/or with an acquisition of the media content asset as may serve a particular implementation. For example, the source selection factors may include, but are not limited to, a time factor, a quality factor, a size factor, and a format factor. Each of these source selection factors will now be described in detail.

As used herein, a "time factor" may be associated with an amount of time that it takes for the media content asset to be acquired from a particular media content source (an "acquisition time"). The acquisition time may depend on how the media content asset is distributed by the media content source, a file size of the media content asset, an amount of bandwidth that may be used to acquire the media content asset, one or more transmission limitations of the media content source, and/or any other factor as may serve a particular implementation. To illustrate, it may take more time to acquire (e.g., record) the media content asset from a broadcast television source that is not scheduled to broadcast the media content asset until a particular day in the future than to acquire (e.g., download) the media content asset from an Internet source that has the media content asset available for immediate download. However, if bandwidth associated with downloading the media content asset from the Internet source is limited for whatever reason, it may be faster to acquire the media content asset by recording the media content asset when it is broadcast by the broadcast television source.

A "quality factor" may be associated with one or more video quality attributes of the media content asset. For example, the quality factor may be associated with a resolution of the media content asset (e.g., SD, HD, etc.) and/or any other video quality attribute of the media content asset as may serve a particular implementation. The quality factor may additionally or alternatively refer to one or more acoustic quality attributes of the media content asset (e.g., a sound level of the media content asset, a type of audio encoding associated with the media content asset, etc.), and/or any other acoustic quality attribute of the media content asset as may serve a particular implementation.

A "size factor" may be associated with one or more size attributes associated with the media content asset. For example, the size factor may be associated with an amount of storage space that will be occupied by data representative of the media content asset within a hard drive and/or any other suitable storage medium used by the second DVR system. The size factor may additionally or alternatively refer to a size (e.g., a number of bytes) of a file representative of the media content asset, an amount of data that will be transmitted between a media content source and the second DVR system during an acquisition by the second DVR system of the media content asset from the media content source, and/or any other size attribute as may serve a particular implementation.

A "format factor" may be associated with a format of the media content asset. For example, the format factor may be associated with a file format (e.g., MPEG-4, AVI, etc.) of the media content asset, a compression algorithm used to encode the media content asset, and/or any other format factor as may serve a particular implementation.

Other source selection factors may also be considered by the source selection heuristic. For example, a cost factor associated with a cost of acquiring a particular media content asset may additionally or alternatively be considered by media content asset management facility 504 in selecting a particular media content source for the media content asset. However, it will be assumed that the source selection factors include a time factor, a quality factor, a size factor, and a format factor for purposes of the examples provided herein.

The relative importance of the source selection factors (i.e., a weighting of the source selection factors) may be determined automatically by media content asset management facility 504, specified by a user, and/or otherwise set as may serve a particular implementation.

For example, media content asset management facility 504 may automatically weight a first source selection factor more than a second source selection factor by analyzing data included in the DVR data set associated with the second DVR system, identifying one or more tendencies of the user associated with the second DVR system, and/or in any other suitable manner.

To illustrate, media content asset management facility 504 may analyze one or more settings and/or business logic specified by the DVR data set associated with the second DVR system to automatically determine that the user prefers to record media content assets in HD rather than in SD. In response to this determination, media content asset management facility 504 may weight the quality factor higher than the size factor. Assuming that one or more other source selection factors are not weighted higher than the quality factor, media content asset management facility 504 may, in accordance with this weighting, select a media content source that has an HD version of a media content asset available for distribution instead of a second media content source that has a SD version of the same media content asset, even though the SD version is smaller in size.

As another example, media content asset management facility 504 may determine, based on the DVR data set associated with the second DVR system, that the user prefers to acquire media content assets in MPEG-4 format (e.g., so that the user can play the media content assets on different types of devices). In response, media content asset management facility 504 may automatically increase the weight of the format factor and specify that MPEG-4 versions of the media content assets are preferable to other types of formats.

As another example, media content asset management facility 504 may automatically determine, based on a viewing history of the user, that the user regularly watches a particular media content asset included in the library of media content assets. Media content asset management facility 504 may accordingly increase a weighting of the time factor associated with the media content asset so that media content asset management facility 504 selects a media content source that allows the second DVR system to acquire the media content asset as quickly as possible. Increasing the weighting of the time factor of the media content asset may additionally or alternatively allow the second DVR system to prioritize an acquisition of the media content asset over other media content assets included in the library of media content assets.

Figure 9:
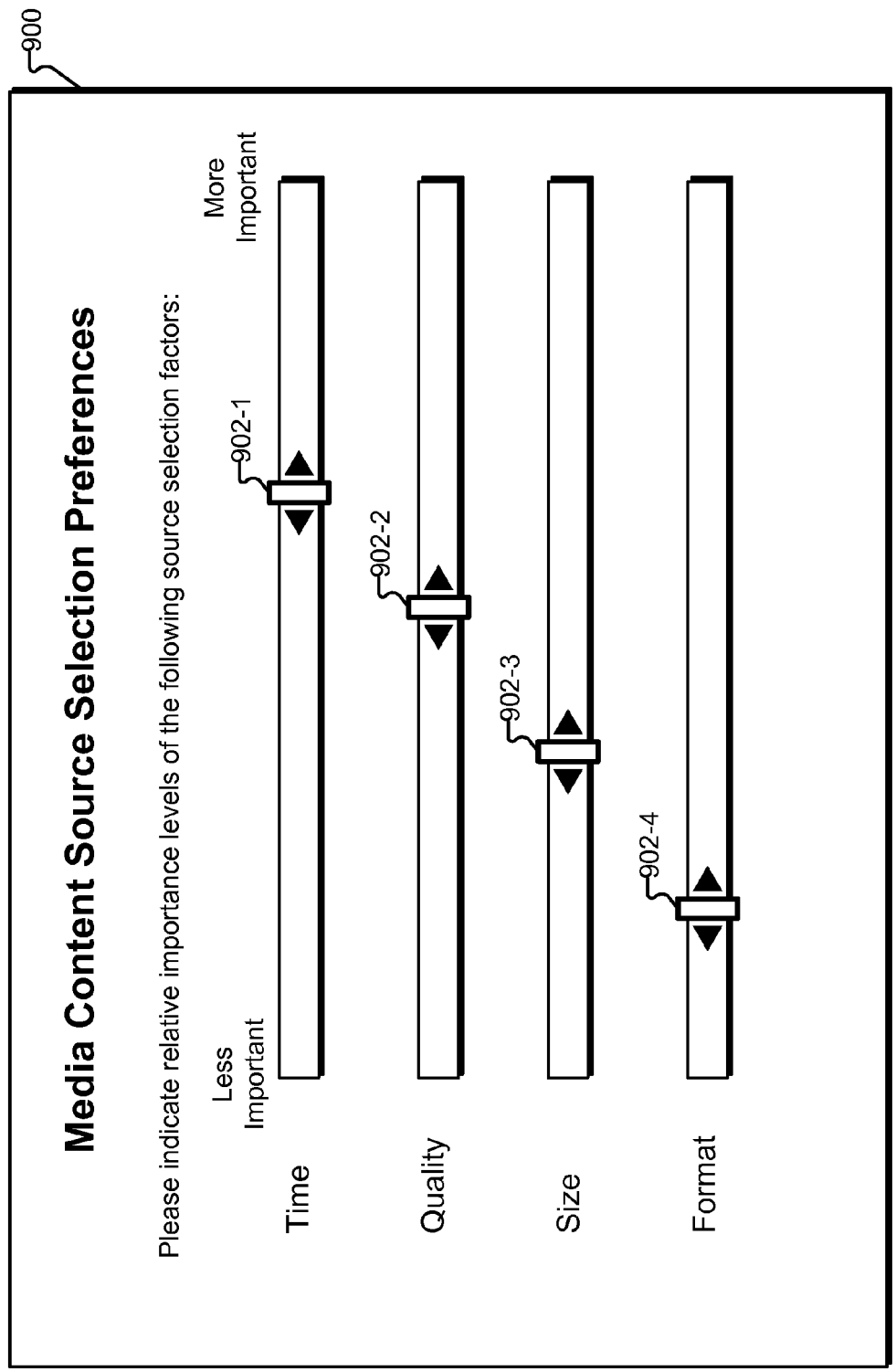
FIGS. 9-13 show exemplary graphical user interfaces in accordance with the methods and systems described herein.

Additionally or alternatively, media content asset management facility 504 may weight one or more source selection factors in response to user input. To illustrate, FIG. 9 shows an exemplary graphical user interface ("GUI") 900 that may be presented to user and that may facilitate manual weighting of one or more source selection factors by the user. As shown, GUI 900 may include graphical depictions of sliders 902 (e.g., sliders 902-1 through 904-4) corresponding to each of a plurality of source selection factors. A user may adjust a position of sliders 902 (e.g., by moving sliders 902 left or right) to adjust a weighting of each source selection factor. In this manner, the user may specify a relative importance level of each source selection factor.

For example, the user may adjust the position of slider 902-1 to adjust the weighting of the time factor, adjust the position of slider 902-2 to adjust the weighting of the quality factor, adjust the position of slider 902-3 to adjust the weighting of the size factor, and adjust the position of slider 902-4 to adjust the weighting of the format factor. In the example of FIG. 9, the position of sliders 902 indicates that the user considers the time factor to be the most important source selection factor out of the four source selection factors listed in GUI 900.

It will be recognized that the source selection factors represented in GUI 900 may be associated with a single media content asset, a category of media content assets (e.g., a particular genre of media content assets), and/or the entire library of media content assets as may serve a particular implementation.

Figure 10:
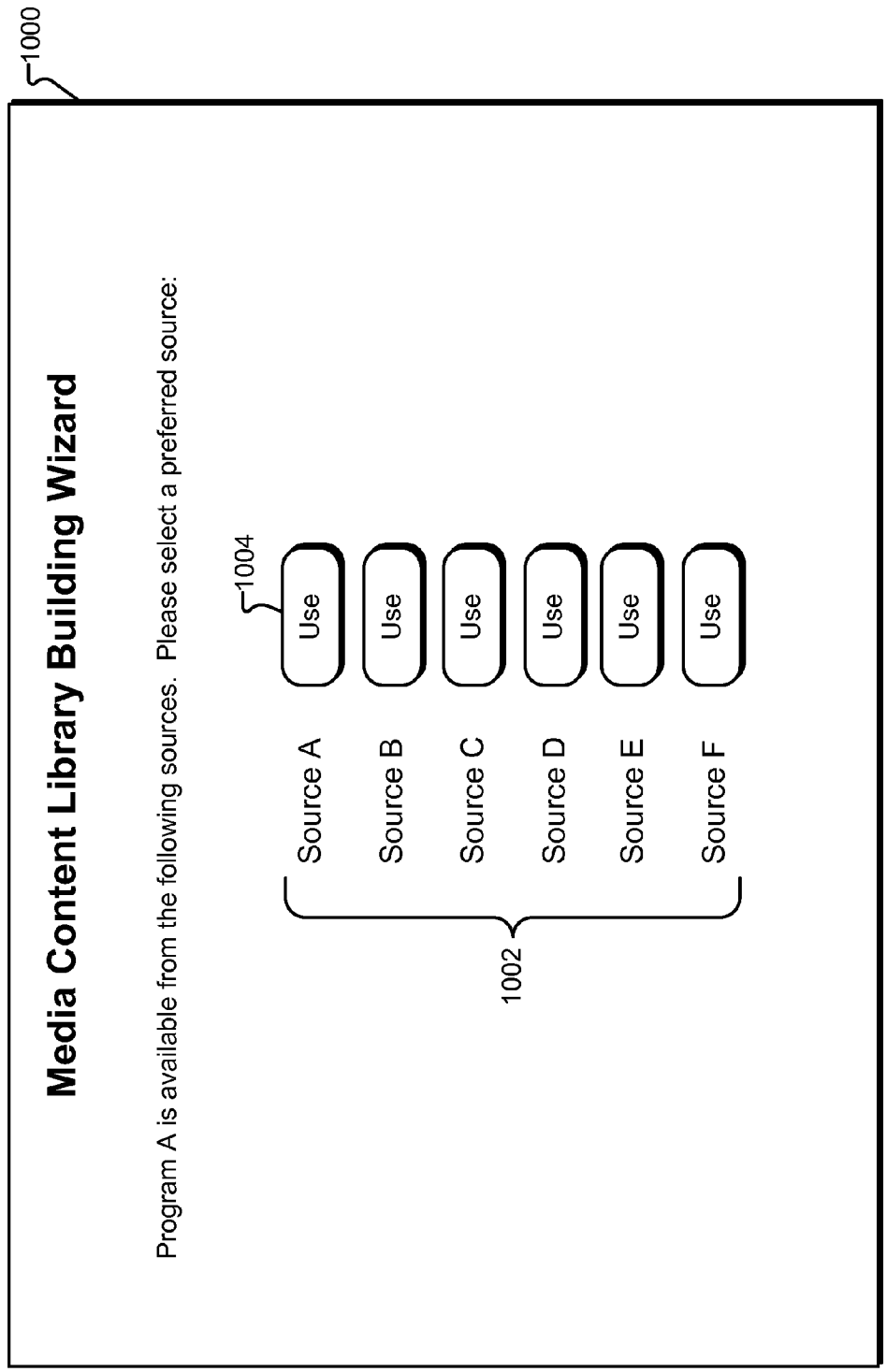

In some examples, media content asset management facility 504 may select a media content source based on user input. For example, FIG. 10 shows an exemplary GUI 1000 that may be provided by media content asset management facility 504 for presentation to the user and that may list a plurality of media content source options 1002 each representative of a potential media content source for a media content asset named "program A". Media content asset management facility 504 may detect a selection by the user of one of the media content source options 1002 and select the media content source represented by the selected option as the media content source from which the second DVR system is to acquire the media content asset named "program A". To illustrate, media content asset management facility 504 may detect a selection of button 1004 and select a media content source named "source A" as the media content source from which the second DVR system is to acquire the media content asset named "program A".

Once a media content source has been selected, media content asset management facility 504 may direct the second DVR system to acquire the media content asset from the selected media content source for storage by the second DVR system. This may be performed in any suitable manner.

For example, media content asset management facility 504 may select an Internet source (e.g., a website, etc.) as the media content source from which the second DVR system is to acquire the media content asset. Media content asset management facility 504 may accordingly direct the second DVR system to acquire the media content asset by downloading the media content asset from the Internet source.

As another example, media content asset management facility 504 may select a broadcast television source configured to broadcast the media content asset during a scheduled time period as the media content source from which the second DVR system is to acquire the media content asset. Media content asset management facility 504 may accordingly direct the second DVR system to acquire the media content asset by directing the second DVR system to record the media content asset while the media content asset is being broadcast during the scheduled time period.

As another example, media content asset management facility 504 may select a video-on-demand source as the media content source from which the second DVR system is to acquire the media content asset. Media content asset management facility 504 may accordingly direct the second DVR system to acquire the media content asset by directing the second DVR system to request access to the media content asset provided by the video-on-demand source and record the media content asset while it is being presented by the video-on-demand source.

As another example, media content asset management facility 504 may select a DVR system associated with an additional user account (e.g., a user account associated with another user) as the media content source from which the second DVR system is to acquire the media content asset. Media content asset management facility 504 may accordingly direct the second DVR system to acquire the media content asset by directing the second DVR system to acquire the media content asset from the DVR system associated with the additional user account in accordance with a peer-to-peer file sharing heuristic. In some examples, the peer-to-peer file sharing heuristic may be provided and/or supported by a provider (e.g., a subscriber television network provider) of the DVR systems.

In some examples, media content asset management facility 504 may direct the second DVR system to acquire a different version of the media content asset than that stored by the first DVR system. For example, the first DVR system may record only a portion of a particular media content asset (e.g., in cases where the user directs the first DVR system to begin recording the media content asset after a presentation of the media content asset has already begun). In this case, media content asset management facility 504 may direct the second DVR system to acquire a complete version of the media content asset.

Figure 11:
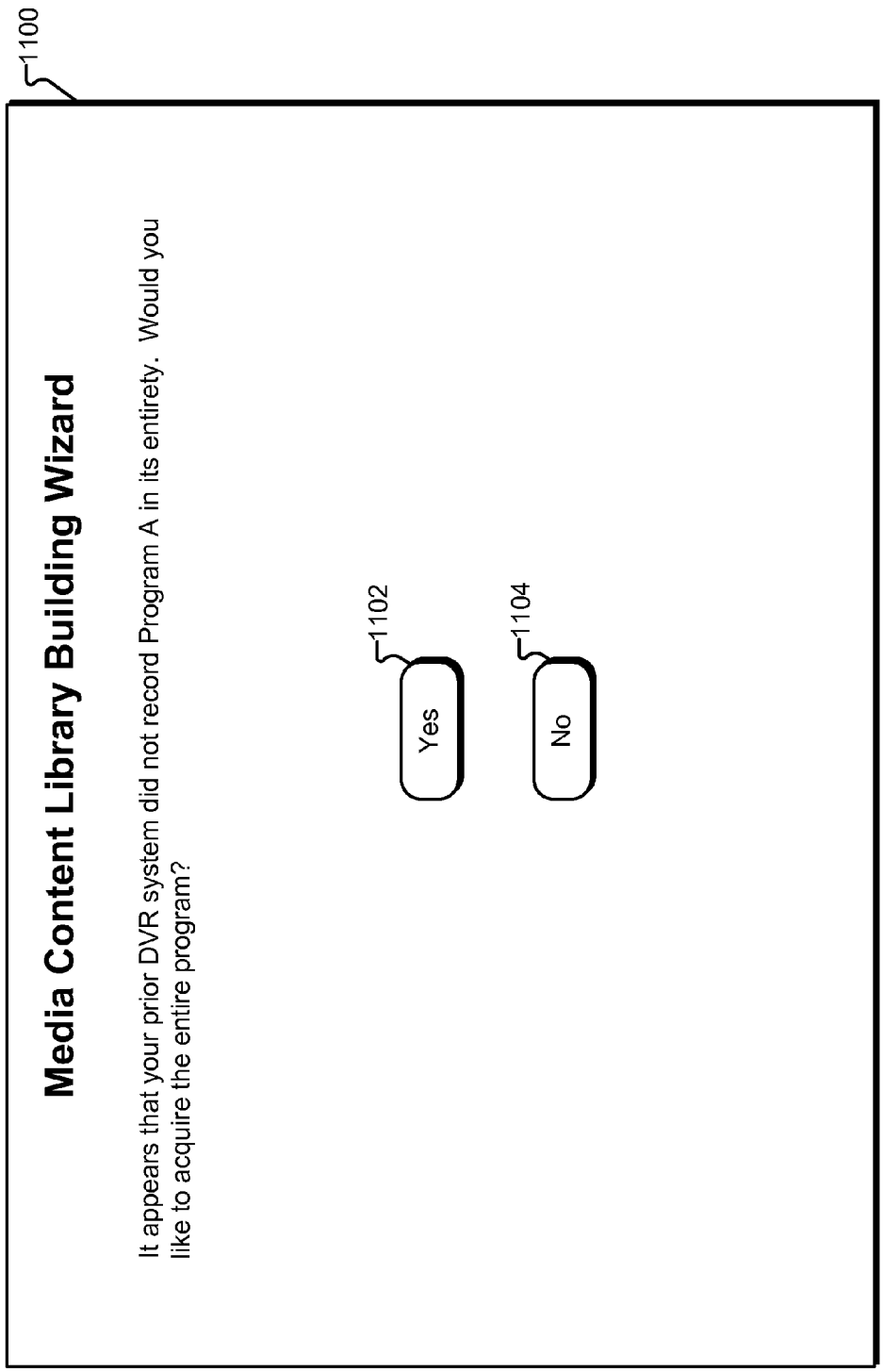

In some examples, media content asset management facility 504 may direct the second DVR system to acquire a complete version of the media content asset in response to user input. For example, FIG. 11 illustrates an exemplary GUI 1100 that may be presented to the user when media content asset management facility 504 detects that the first DVR system has recorded only a portion of a particular media content asset. As shown, GUI 1100 may include an option 1102 that may be selected by the user if the user would like the second DVR system to acquire a complete version of the media content asset. GUI 1100 may additionally include an option 1104 that may be selected by the user if the user would prefer that the second DVR system acquire only the recorded portion of the media content asset. Media content asset management facility 504 may direct the second DVR system to acquire the media content asset in accordance with whichever option is selected by the user.

As another example, the first DVR system may record an SD version of a particular media content asset because of storage constraints of the first DVR system. However, the second DVR system may have relatively more storage capacity. Hence, media content asset management facility 504 may direct the second DVR system to acquire an HD version of the media content asset for storage by the second DVR system. This may be performed, for example, in accordance with the second DVR data set associated with the second DVR system.

Media content asset management facility 504 may be further configured to graphically indicate an acquisition status of one or more media content assets being acquired by the second DVR system. This may be performed by directing the second DVR system to graphically indicate the acquisition status, directing another computing device (e.g., a mobile device such as a mobile phone or tablet computer) to graphically indicate the acquisition status, or in any other manner as may serve a particular implementation. As used herein, an "acquisition status" of one or more media content assets may indicate an approximate amount of time remaining before the one or more media content assets are fully acquired.

Figure 12:
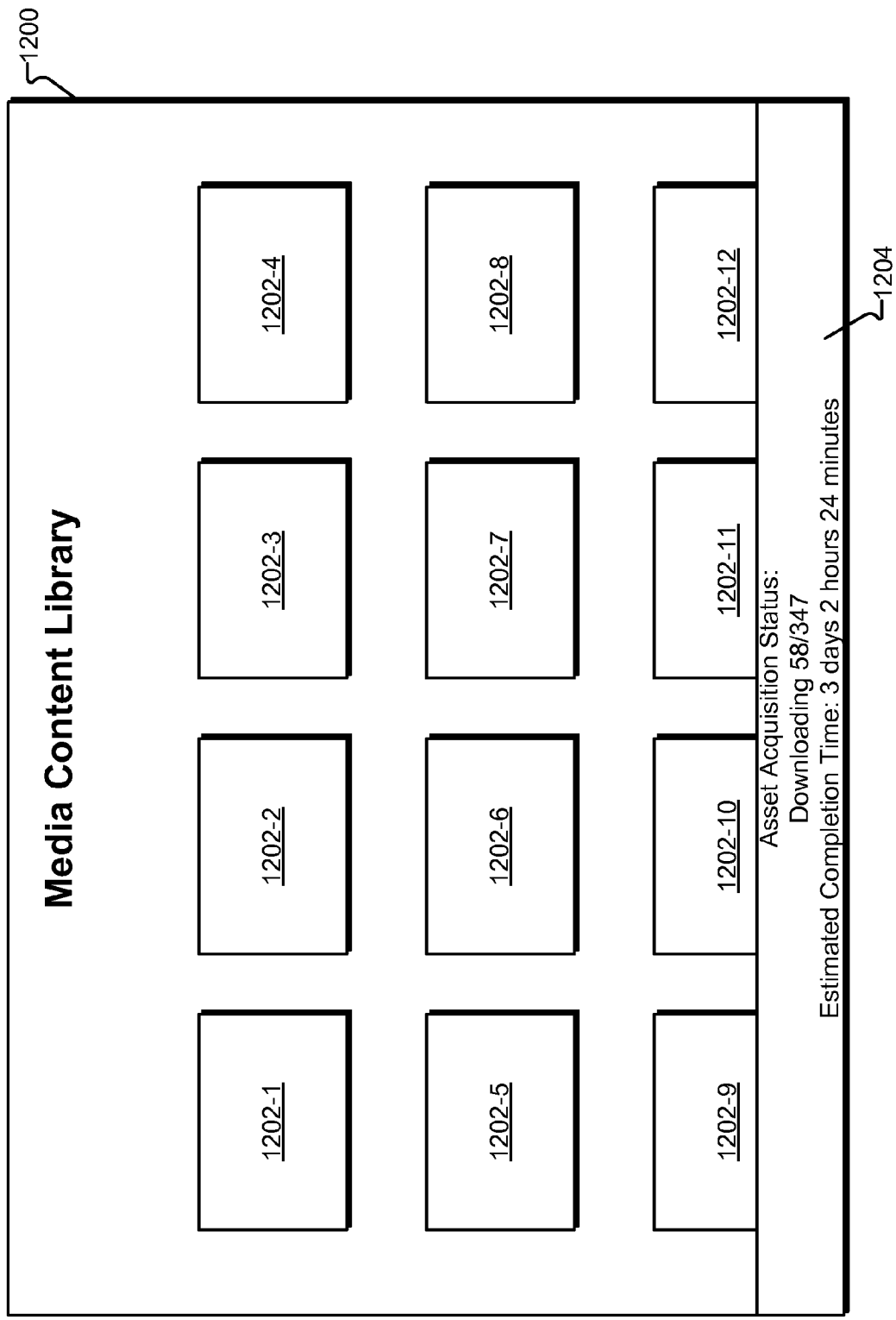

To illustrate, FIG. 12 shows an exemplary media content library GUI 1200 that may list each media content asset included in a library of media content assets stored by the second DVR system. For example, FIG. 12 shows that a plurality of display elements 1202 (e.g., display elements 1202-1 through 1202-12) may be presented within GUI 1200. Each display element is representative of a particular media content asset included in the library of media content assets stored by the second DVR system. For example, each display element may include a selectable movie poster, image, or other graphic representative of the display element's associated media content asset.

As shown, a notification area 1204 may be presented within GUI 1200 in which an acquisition status of the entire library of media content assets may be presented. In the particular example of FIG. 12, notification area 1204 shows that 58 out of 347 media content assets have been acquired and that the estimated completion time for acquiring the entire library of media content assets is approximately three days, two hours, and twenty-four minutes. Acquisition statuses associated with individual media content assets may be additionally or alternatively presented within GUI 1200 in a similar manner.

Figure 13:
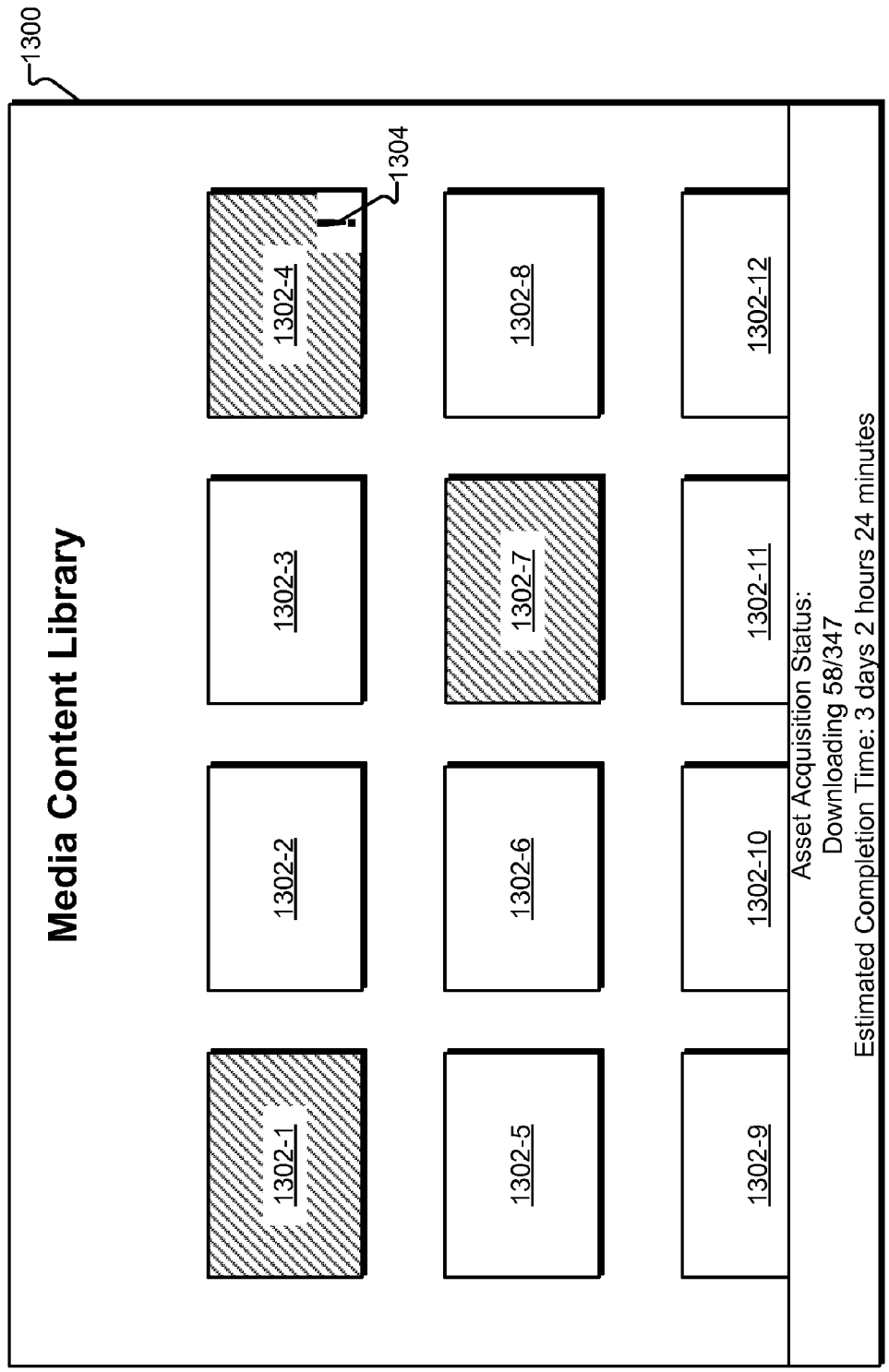

In some examples, media content asset management facility 504 may graphically indicate which media content assets included in the library of media content assets have not yet been acquired. For example, FIG. 13 shows another exemplary media content library GUI 1300. GUI 1300 is similar to GUI 1200 in that GUI 1300 includes a plurality of display elements 1302 (e.g., display elements 1302-1 through 1302-12) representative of media content assets included in a library of media content assets. However, GUI 1300 differs from GUI 1200 in that GUI 1300 includes a display element 1302 for each media content asset included in the library of media content assets, regardless of whether the media content assets have been acquired yet by the second DVR system. For example, display elements 1302-1, 1302-4, and 1302-7 may be shaded (or otherwise distinguished from the rest of display elements 1302) and represent media content assets that have not yet been acquired by the second DVR system. The remaining display elements 1302 shown in GUI 1300 represent media content assets that have been fully acquired by the second DVR system.

By accessing GUI 1300, a user may readily ascertain which media content assets have not yet been acquired by the second DVR system. In some examples, the user may select a display element representative of a media content asset that has not yet been acquired by the second DVR system in order to access an acquisition status of the media content asset. For example, the user may select display element 1302-1 to access information descriptive of when the display element's corresponding media content asset is going to be acquired, access information descriptive of the media content source selected for the media content asset, and/or prioritize the acquisition of the media content asset (e.g., by bumping the media content asset up in an acquisition queue of the second DVR system).

In some examples, a user may no longer have access to a particular media content asset included in the library of media content assets after the user has migrated from the first DVR system to the second DVR system. For example, a particular media content asset may be protected with DRM technology that allows the media content asset to be presented only if the user subscribes to a premium media content channel (e.g., HBO). If the user no longer subscribes to the premium media content channel after the migration, the user may no longer access the media content asset. In some examples, media content asset management facility 504 may graphically indicate this loss of access within GUI 1300.

To illustrate, FIG. 13 shows that a notifier 1304 may be presented within display element 1302-4, thereby indicating that the media content asset represented by display element 1302-4 is no longer available for access by the user. In some examples, the user may select display element 1302-4 to access one or more options associated with the unavailable media content asset. For example, the user may select display element 1302-4 to find out why he or she may no longer access the media content asset, purchase access to the media content asset (e.g., by subscribing to the premium media content channel), and/or access one or more other options associated with the media content asset.

In some examples, media content asset management facility 504 may determine that a particular media content asset included in the library of media content assets is unavailable for distribution by any media content source. In these examples, media content asset management facility 504 may provide a notification of the unavailability of the media content asset for presentation to the user. The notification may be provided within a GUI (e.g., within any of the GUIs described herein), in the form of a message to the user, and/or in any other manner.

Returning to FIG. 5, storage facility 506 may be configured to store source selection heuristic data 508 representative of one or more source selection heuristics and DVR data 510 representative of one or more DVR data sets. Storage facility 506 may maintain additional or alternative data as may serve a particular implementation.

As mentioned, in certain examples, system 500 may be implemented entirely by the second DVR system. For example, system 500 may be implemented entirely by a single processing device. The processing device may include a storage device and a processor. The storage device may be configured store data representative of media content assets. The processor may be configured to 1) detect a registration of a user account with the processing device, 2) determine that the user account was registered with a DVR system separate from the processing device prior to the registration, 3) identify, in response to the determination, a media content asset included within a library of one or more media content assets stored by the DVR system while the user account was registered with the DVR system, 4) select, in accordance with a source selection heuristic, a media content source other than the DVR system and that is configured to distribute the media content asset, and 5) acquire the media content asset from selected media content source for storage within storage device.

Figure 14:
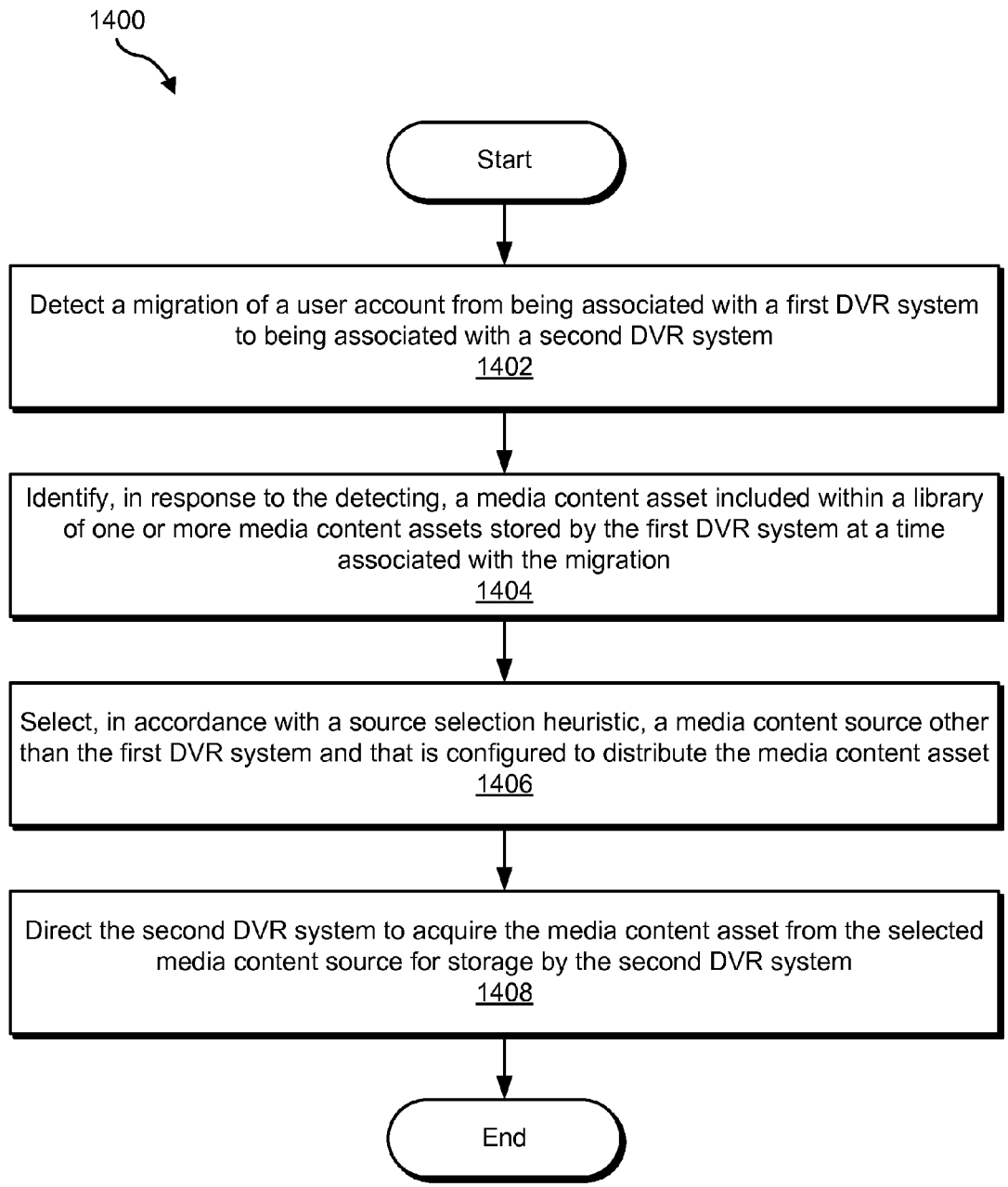
FIG. 14 illustrates an exemplary media content asset recovery method according to principles described herein.

FIG. 14 illustrates an exemplary media content asset recovery method 1400. While FIG. 14 illustrates exemplary steps according to one embodiment, other embodiments may omit, add to, reorder, and/or modify any of the steps shown in FIG. 14. One or more of the steps shown in FIG. 14 may be performed by media content asset recovery system 500 and/or any implementation thereof.

In step 1402, a media content asset recovery system detects a migration of a user account from being associated with a first DVR system to being associated with a second DVR system. Step 1402 may be performed in any of the ways described herein.

In step 1404, the media content asset recovery system identifies, in response to the detection, a media content asset included within a library of one or more media content assets stored by the first DVR system at a time associated with the migration. Step 1404 may be performed in any of the ways described herein.

In step 1406, the media content asset recovery system selects, in accordance with a source selection heuristic, a media content source other than the first DVR system and that is configured to distribute the media content asset. Step 1406 may be performed in any of the ways described herein.

In step 1408, the media content asset recovery system directs the second DVR system to acquire the media content asset from the selected media content source for storage by the second DVR system. Step 1408 may be performed in any of the ways described herein.

Figure 15:
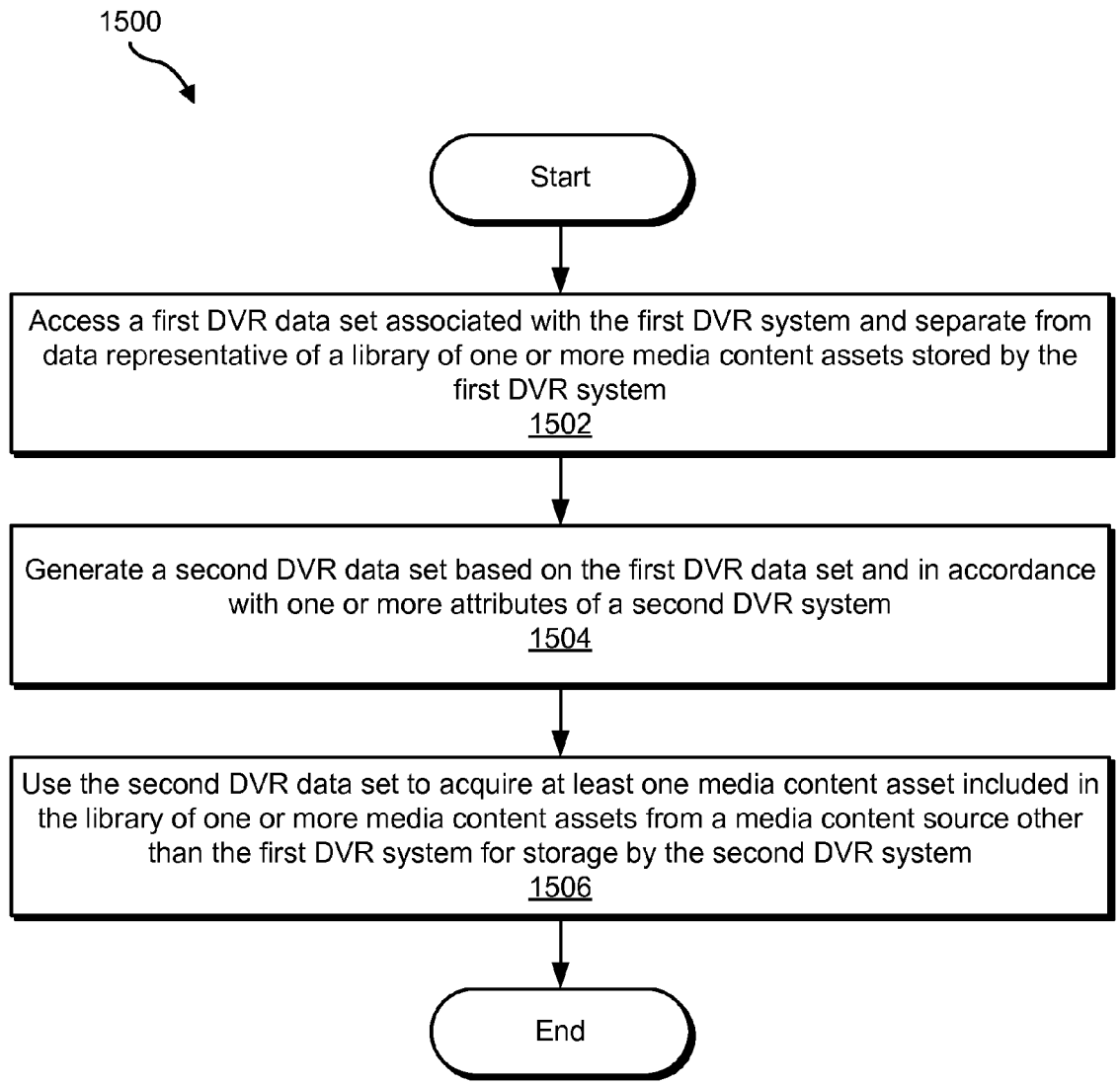
FIG. 15 illustrates another exemplary media content asset recovery method according to principles described herein.

FIG. 15 illustrates another exemplary media content asset recovery method 1500. While FIG. 15 illustrates exemplary steps according to one embodiment, other embodiments may omit, add to, reorder, and/or modify any of the steps shown in FIG. 15. One or more of the steps shown in FIG. 15 may be performed by media content asset recovery system 500 and/or any implementation thereof.

In step 1502, a media content asset recovery system accesses a first DVR data set associated with the first DVR system and separate from data representative of a library of one or more media content assets stored by the first DVR system. Step 1502 may be performed in any of the ways described herein.

In step 1504, the media content asset recovery system generates a second DVR data set based on the first DVR data set and in accordance with one or more attributes of a second DVR system. Step 1504 may be performed in any of the ways described herein.

In step 1506, the media content asset recovery system uses the second DVR data set to acquire at least one media content asset included in the library of one or more media content assets from a media content source other than the first DVR system for storage by the second DVR system. Step 1506 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 16:
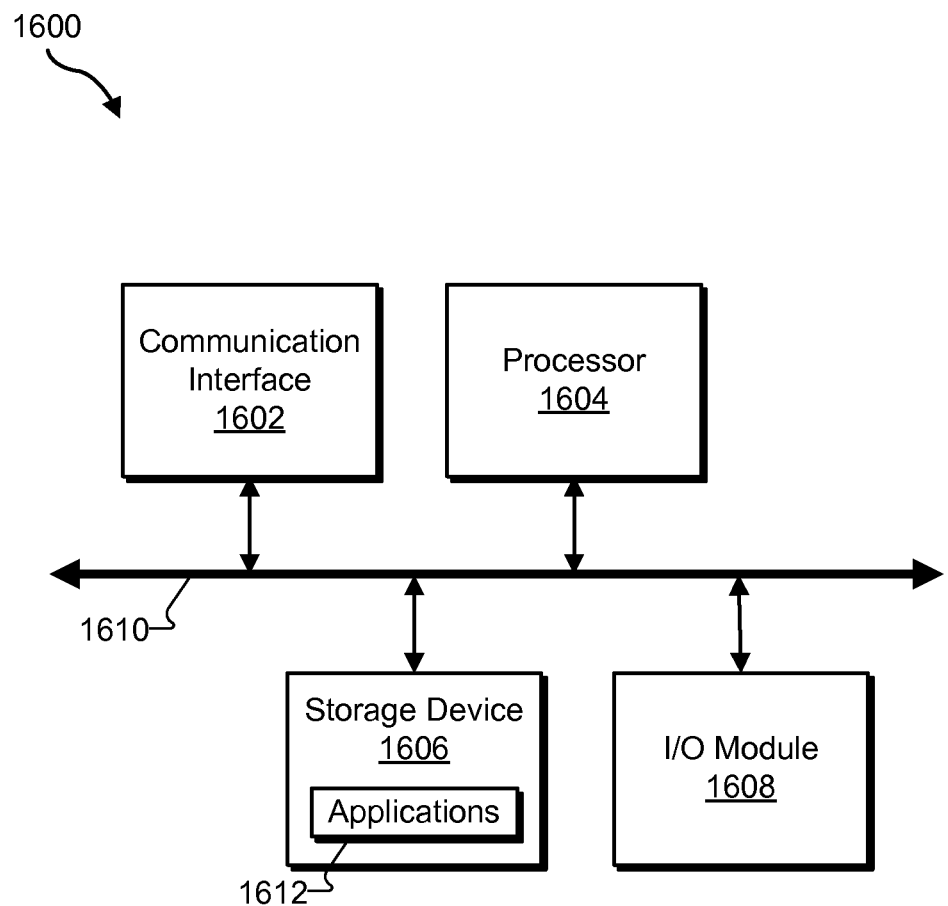
FIG. 16 illustrates an exemplary computing device according to principles described herein.

FIG. 16 illustrates an exemplary computing device 1600 that may be configured to perform one or more of the processes described herein. As shown in FIG. 16, computing device 1600 may include a communication interface 1602, a processor 1604, a storage device 1606, and an input/output ("I/O") module 1608 communicatively connected via a communication infrastructure 1610. While an exemplary computing device 1600 is shown in FIG. 16, the components illustrated in FIG. 16 are not intended to be limiting. Additional or alternative components may be used in other embodiments. Components of computing device 1600 shown in FIG. 16 will now be described in additional detail.

Communication interface 1602 may be configured to communicate with one or more computing devices. Examples of communication interface 1602 include, without limitation, a wired network interface (such as a network interface card), a wireless network interface (such as a wireless network interface card), a modem, an audio/video connection, and any other suitable interface.

Processor 1604 generally represents any type or form of processing unit capable of processing data or interpreting, executing, and/or directing execution of one or more of the instructions, processes, and/or operations described herein. Processor 1604 may direct execution of operations in accordance with one or more applications 1612 or other computer-executable instructions such as may be stored in storage device 1606 or another computer-readable medium.

Storage device 1606 may include one or more data storage media, devices, or configurations and may employ any type, form, and combination of data storage media and/or device. For example, storage device 1606 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1606. For example, data representative of one or more executable applications 1612 configured to direct processor 1604 to perform any of the operations described herein may be stored within storage device 1606. In some examples, data may be arranged in one or more databases residing within storage device 1606.

I/O module 1608 may be configured to receive user input and provide user output and may include any hardware, firmware, software, or combination thereof supportive of input and output capabilities. For example, I/O module 1608 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1608 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1608 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 1600. For example, one or more applications 1612 residing within storage device 1606 may be configured to direct processor 1604 to perform one or more processes or functions associated with detection facility 502 and/or media content asset management facility 504. Likewise, storage facility 506 may be implemented by or within storage device 1606.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by a media content asset recovery system, a migration of a user account from being associated with a first digital video recording ("DVR") system to being associated with a second DVR system;
   accessing, by the media content asset recovery system, a second DVR data set stored within a memory of the second DVR system, the second DVR data set including modified metadata generated, by a DVR data migration management system in accordance with one or more attributes of the second DVR system, by modifying metadata that is included in a first DVR data set associated with the first DVR system and that is descriptive of a plurality of media content assets included within a library of media content assets stored by the first DVR system at a time associated with the migration, wherein the second DVR data set does not include the plurality of media content assets;

identifying, by the media content asset recovery system based on the modified metadata included in the second DVR data set, particular versions of the plurality of media content assets that are different from versions of the plurality of media content assets included within the library of media content assets stored by the first DVR system at the time associated with the migration;

selecting, by the media content asset recovery system in accordance with a source selection heuristic a media content source that is other than the first DVR system, that receives the identified particular versions of the plurality of media content assets from a source other than the first DVR system, and that is configured to distribute the identified particular versions of the plurality of media content assets; and directing, by the media content asset recovery system, the second DVR system to rebuild the library of media content assets by acquiring, based on the modified metadata included in the second DVR data set, a complete version of each of the identified particular versions of the plurality of media content assets from the selected media content source for local storage by the second DVR system, wherein the second DVR data set that includes the modified metadata but that does not include the plurality of media content assets is stored within the memory of the second DVR system prior to the acquiring of the complete version of each of the identified particular versions of the plurality of media content assets to rebuild the library of media content assets.

2. The method of claim 1, further comprising:

identifying, by the media content asset recovery system in response to the detecting, one or more other media content assets included within the library of media content assets stored by the first DVR system at the time associated with the migration;

selecting, by the media content asset recovery system in accordance with the source selection heuristic, one or more media content sources other than the first DVR system and that are configured to distribute the one or more other media content assets; and directing, by the media content asset recovery system, the second DVR system to acquire the identified one or more other media content assets from the one or more media content sources for storage by the second DVR system.

3. The method of claim 1, wherein the detecting of the migration of the user account from being associated with the first DVR system to being associated with the second DVR system comprises detecting a registration of the user account with the second DVR system.

4. The method of claim 1, wherein the selecting of the media content source comprises:

providing a plurality of media content source options each representative of a potential media content source for the media content asset for presentation within a graphical user interface;

detecting a selection by a user of a media content source option included in the plurality of media content source options; and selecting the media content source in accordance with the selected media content source option.

5. The method of claim 1, wherein the selected media content source is an Internet source, and wherein the directing of the second DVR system to acquire the complete version of each of the identified particular versions of the plurality of media content assets comprises directing the second DVR system to download the complete version of each of the identified particular versions of the plurality of media content assets from the Internet source.

6. The method of claim 1, wherein the selected media content source is a broadcast television source that broadcasts the identified particular versions of the plurality of media content assets during a scheduled time period, and wherein the directing of the second DVR system to acquire the complete version of each of the identified particular versions of the plurality of media content assets comprises directing the second DVR system to record the complete version of each of the identified particular versions of the plurality of media content assets while the identified particular versions of the plurality of media content assets are being broadcast during the scheduled time period.

7. The method of claim 1, wherein the selected media content source is video-on-demand source, and wherein the directing of the second DVR system to acquire the complete version of each of the identified particular versions of the plurality of media content assets comprises directing the second DVR system to acquire the complete version of each of the identified particular versions of the plurality of media content assets from the video-on-demand source.

8. The method of claim 1, wherein the selected media content source is a DVR system associated with an additional user account, and wherein the directing of the second DVR system to acquire the complete version of each of the identified particular versions of the plurality of media content assets comprises directing the second DVR system to acquire the complete version of each of the identified particular versions of the plurality of media content assets from the DVR system associated with the additional user account in accordance with a peer-to-peer file sharing heuristic.

9. The method of claim 1, wherein a media content asset included in the plurality of media content assets is a partially recorded media content asset.

10. The method of claim 1, wherein a media content asset included in the plurality of media content assets that is stored by the first DVR system is of a first resolution, and wherein the directing of the second DVR system to acquire the complete version of the media content asset comprises directing the second DVR system to acquire, based on the modified metadata, a particular complete version of the media content asset that is of a second resolution.

11. The method of claim 1, wherein the selecting of the media content source in accordance with the source selection heuristic comprises:

weighing a plurality of source selection factors associated with a plurality of media content sources; and selecting the media content source from the plurality of media content sources in accordance with the weighing of the source selection factors.

12. The method of claim 11, wherein the plurality of source selection factors comprises at least one of a time factor, a quality factor, a size factor, and a format factor.

13. The method of claim 1, further comprising graphically indicating, by the media content asset recovery system, an acquisition status of a media content asset included in the plurality of media content assets.

14. The method of claim 1, further comprising:

identifying, by the media content asset recovery system in response to the detecting, an additional media content asset included within the library of media content assets stored by the first DVR system at a time associated with the migration;

determining, by the media content asset recovery system, that the additional media content asset is unavailable for distribution by any media content source; and providing, by the media content asset recovery system, a notification of the unavailability of the media content asset.

15. The method of claim 1, embodied as computer-executable instructions on at least one non-transitory computer-readable medium.

16. A method comprising:

accessing, by a media content asset recovery system, a first digital video recording ("DVR") data set associated with a first DVR system and separate from data representative of a library of one or more media content assets stored by the first DVR system, the first DVR data set including metadata descriptive of the one or more media content assets stored by the first DVR system;

generating, by the media content asset recovery system, a second DVR data set by modifying the metadata included in the first DVR data set based on one or more attributes of a second DVR system;

storing, by the media content asset recovery system after the generating of the second DVR data set, the second DVR data set within a memory of the second DVR system, wherein the second DVR data set does not include the plurality of media content assets;

identifying, by the media content asset recovery system based on the modified metadata included in the second DVR data set, a particular version of at least one of the one or more media content assets that is different from a version of the at least one media content asset included within the library of media content assets stored by the first DVR system at the time associated with the migration; and using, by the media content asset recovery system, the second DVR data set to acquire a complete version of the identified particular version of the at least one media content asset included in the library of one or more media content assets from a media content source that is other than the first DVR system and that receives the identified particular version of the at least one media content asset from a source other than the first DVR system for local storage by the second DVR system, wherein the second DVR data set that includes the modified metadata but that does not include the plurality of media content assets is stored within the memory of the second DVR system prior to the acquiring of the complete version of the identified particular version of the at least one media content asset included in the library of one or more media content assets to rebuild the library of one or more media content assets.

17. The method of claim 16, embodied as computer-executable instructions on at least one non-transitory computer-readable medium.

18. A system comprising:

a detection facility that detects a migration of a user account from being associated with a first digital video recording ("DVR") system to being associated with a second DVR system; and a media content asset management facility communicatively coupled to the detection facility and that accesses a second DVR data set stored within a memory of the second DVR system, the second DVR data set including modified metadata generated, by a DVR data migration management system in accordance with one or more attributes of the second DVR system, by modifying metadata that is included in a first DVR data set associated with the first DVR system and that is descriptive of a plurality of media content assets included within a library of media content assets stored by the first DVR system at a time associated with the migration, wherein the second DVR data set does not include the plurality of media content assets, identifies based on the modified metadata included in the second DVR data set, particular versions of the plurality of media content assets that are different from versions of the plurality of media content assets included within the library of media content assets stored by the first DVR system at the time associated with the migration, selects, in accordance with a source selection heuristic, a media content source that is other than the first DVR system, that receives the identified particular versions of the plurality of media content assets from a source other than the first DVR system, and that is configured to distribute the identified particular versions of the plurality of media content assets, and directs the second DVR system to rebuild the library of media content assets by acquiring, based on the modified metadata included in the second DVR data set, a complete version of each of the identified particular versions of the plurality of media content assets from the selected media content source for local storage by the second DVR system, wherein the second DVR data set that includes the modified metadata but that does not include the plurality of media content assets is stored within the memory of the second DVR system prior to the acquiring of the complete version of each of the identified particular versions of the plurality of media content assets to rebuild the library of media content assets.

19. An apparatus comprising:

a storage device that stores data representative of media content assets; and a processor communicatively coupled to the storage device and that detects a registration of a user account with the apparatus, determines that the user account was registered with a DVR system separate from the apparatus prior to the registration, accesses a second DVR data set stored within the storage device of the apparatus, the second DVR data set including modified metadata generated, by a DVR data migration management system in accordance with one or more attributes of the apparatus, by modifying metadata that is included in a first DVR data set associated with the DVR system and that is descriptive of a plurality of media content assets included within a library of media content assets stored by the DVR system at a time associated with the registration, wherein the second DVR data set does not include the plurality of media content assets, identifies based on the modified metadata included in the second DVR data set, particular versions of the plurality of media content assets that are different from versions of the plurality of media content assets included within the library of media content assets stored by the DVR system at the time associated with the registration, selects, in accordance with a source selection heuristic, a media content source that is other than the DVR system, that receives the identified particular versions of the plurality of media content assets from a source other than the DVR system, and that is configured to distribute the identified particular versions of the plurality of media content assets, and rebuilds the library of media content assets by acquiring, based on the modified metadata included in the second DVR data set, a complete version of each of the identified particular versions of the plurality of media content assets from selected media content source for local storage within the storage device, wherein the second DVR data set that includes the modified metadata but that does not include the plurality of media content assets is stored within the storage device of the apparatus prior to the acquiring of the complete version of each of the identified particular versions of the plurality of media content assets to rebuild the library of media content assets.

20. The method of claim 16, wherein:

the first DVR data set further includes at least one of settings data and business logic data; and the generating of the second DVR data set further includes modifying at least one of the settings data and the business logic data included in the first DVR data set based on the one or more attributes of the second DVR system.

* * * * *